United States Patent [19]

Pelican

[11] Patent Number: 5,572,271
[45] Date of Patent: Nov. 5, 1996

[54] COMPUTER OUTPUT MICROFILM CANISTER

[75] Inventor: Gregory F. Pelican, New Milford, Conn.

[73] Assignee: Fuji Photo Film Co., Ltd., Tokyo, Japan

[21] Appl. No.: 416,150

[22] Filed: Apr. 4, 1995

[51] Int. Cl.$^6$ ................................................. B03B 17/26
[52] U.S. Cl. ........................... 396/512; 352/172; 355/72; 396/284
[58] Field of Search .................... 354/217, 21, 289.1, 354/275; 352/172; 355/72

[56] References Cited

U.S. PATENT DOCUMENTS

| | | |
|---|---|---|
| 3,977,776 | 8/1976 | Wagensonner et al. . |
| 4,576,455 | 3/1986 | Fazekas . |
| 4,728,976 | 3/1988 | Takahashi et al. . |
| 4,806,958 | 2/1989 | Momot et al. . |
| 4,806,959 | 2/1989 | Townsend . |

Primary Examiner—David M. Gray
Attorney, Agent, or Firm—Brumbaugh, Graves, Donohue & Raymond

[57] ABSTRACT

In the embodiment of the film canister described in the specification, a motion detector detects rotation of a roller each time film is withdrawn from the canister and supplies a corresponding signal to a microprocessor. Since the same length of film is withdrawn each time film is used by the COM system in which the canister is mounted, the microprocessor can determine the total length of film withdrawn from the number of film motion signals it receives. The microprocessor deducts that length from the original film length in the roll to provide an accurate indication of the current length of film stored in the canister. The canister also includes data entry keys and a display panel for displaying information about the type of film in the canister and the remaining film length. In addition, the microprocessor generates signals corresponding to the rate of film roll rotation as the film is withdrawn from the canister for use with various COM systems.

18 Claims, 1 Drawing Sheet

COMPUTER OUTPUT MICROFILM CANISTER

BACKGROUND OF THE INVENTION

This invention relates to canisters for computer output microfilm printers and, more particularly, to a computer output microfilm canister arranged to compute and display the length of film remaining in the canister and to provide appropriate signals to computer output microfilm recording systems.

In computer output microfilm ("COM") systems, light-tight replaceable canisters are designed to be removably installed in the system to supply film to a camera on demand and to provide appropriate signals to the system in accordance with the use-of the film in the canister to indicate the length of film remaining in the canister.

In some COM systems these signals are generated by spaced irregularities in a flange rim or disc which is rotated by withdrawal of film from a roll of film in the canister and, consequently, the signals are generated at a higher rate as the diameter of the roll of film decreases.

Laser COM recorders are capable of exposing several different types of microfilm in the same system and, if an operator removes an existing film supply canister containing one type of film and replaces its with a canister containing a different type of film, information stored in the system relating to the length of film remaining in the first canister is lost when that canister is replaced. In order to retain information regarding the length of film remaining in a canister thus removed before the film supply has been depleted, it is necessary for the COM system operator to record that information on the canister or on a film end extending from the canister.

Moreover, while disposable film canisters, which are designed for single use, contain information about the film such as the film type and film emulsion number printed on the canister, such canisters have the disadvantage of higher cost and produce environmental waste that must be disposed of properly. As a result, high volume COM service bureaus prefer to use reloadable film supply canisters, but unless the appropriate information about the film is marked on the canister each time it is loaded, the operator of the system has no way of knowing what type of film is being used.

U.S. Pat. No. 4,987,300 discloses a COM film canister having an optical-mechanical rotation sensing mechanism which produces an external light signal generated by rotation of a flange connected to a film roll within the canister. As film is withdrawn from the canister, these signals are transmitted to a computer in a COM system which computes the length of film remaining in the canister, taking into account the decreasing diameter of the film in the roll as it is used. If the canister is removed from the COM system, however, the remaining film length information is lost.

Similarly, U.S. Pat. Nos. 5,153,625; 5,247,323 and 5,389,992 disclose film canisters for use with COM systems in which rotation of a disk associated with a film roll contained within a canister generates signals which are sensed through the canister housing by an external detector in the COM system and those signals are used by the system to determine the length of film remaining based on the decreasing diameter of the film roll contained in the canister as the film is used. With this arrangement as well, information relating to the length of film remaining in a canister is lost if the canister is replaced temporarily with another film canister. For such canisters in which the film roll is partially used and the remaining film length is not recorded manually, the length of film remaining in the canister must be redetermined after the canister has been replaced in the system by withdrawing several feet of film to permit a calculation based on the detected rate of motion of the disk or flange associated with the film roll in the canister.

SUMMARY OF THE INVENTION

Accordingly, it is an object of the present invention to provide a COM film canister which overcomes the disadvantage of the prior art.

Another object of the invention is to provide an improved film canister for use with existing COM systems.

A further object of the invention is to provide a film canister which determines and retains information relating to the remaining length of film in the canister.

These and other objects of the invention are attained by providing a canister for use with COM systems in which the length of film remaining in the canister is determined from the number of times a standard length of film has been withdrawn for use in the COM system. This information is stored in the canister so as to be available if the canister is removed before all of the film in the canister has been used. Preferably the canister includes a microprocessor which has a memory for storing information entered by an operator relating to the length of film originally contained in a roll of film mounted in the canister and computing the length of film remaining in the film roll by deducting the number of times film has been withdrawn by the COM system and multiplying that number by the standard length of film withdrawn by the COM system whenever film is used.

Desirably, the microprocessor is powered by a battery stored in the canister and the canister includes a display panel showing the length of film remaining in the canister along with other information such as film speed, film type, emulsion number or the like. To permit use of the canister with COM systems which compute remaining film length based on rotation of a film reel or disk, in which the rate of rotation increases as the length of film remaining on the roll decreases, the microprocessor also generates appropriate output signals detectable from the outside of the canister corresponding to the rate of rotation of the film roll. These signals may be identical to signals produced, for example, by rotation of a disk that moves with the film roll within the canister, as described in U.S. Pat. Nos. 5,153,625, 5,247,333 and 5,389,992 or, alternatively, they may be light signals identical to those produced by detection of the rotation of a film reel as described in U.S. Pat. No. 4,987,300. Consequently, the canister of the invention can be used with the existing COM systems designed for use with such canisters.

BRIEF DESCRIPTION OF THE DRAWINGS

Further objects and advantages of the invention will be apparent from reading the following description in conjunction with the accompanying drawings, in which.

DESCRIPTION OF PREFERRED EMBODIMENTS

Figure 1:
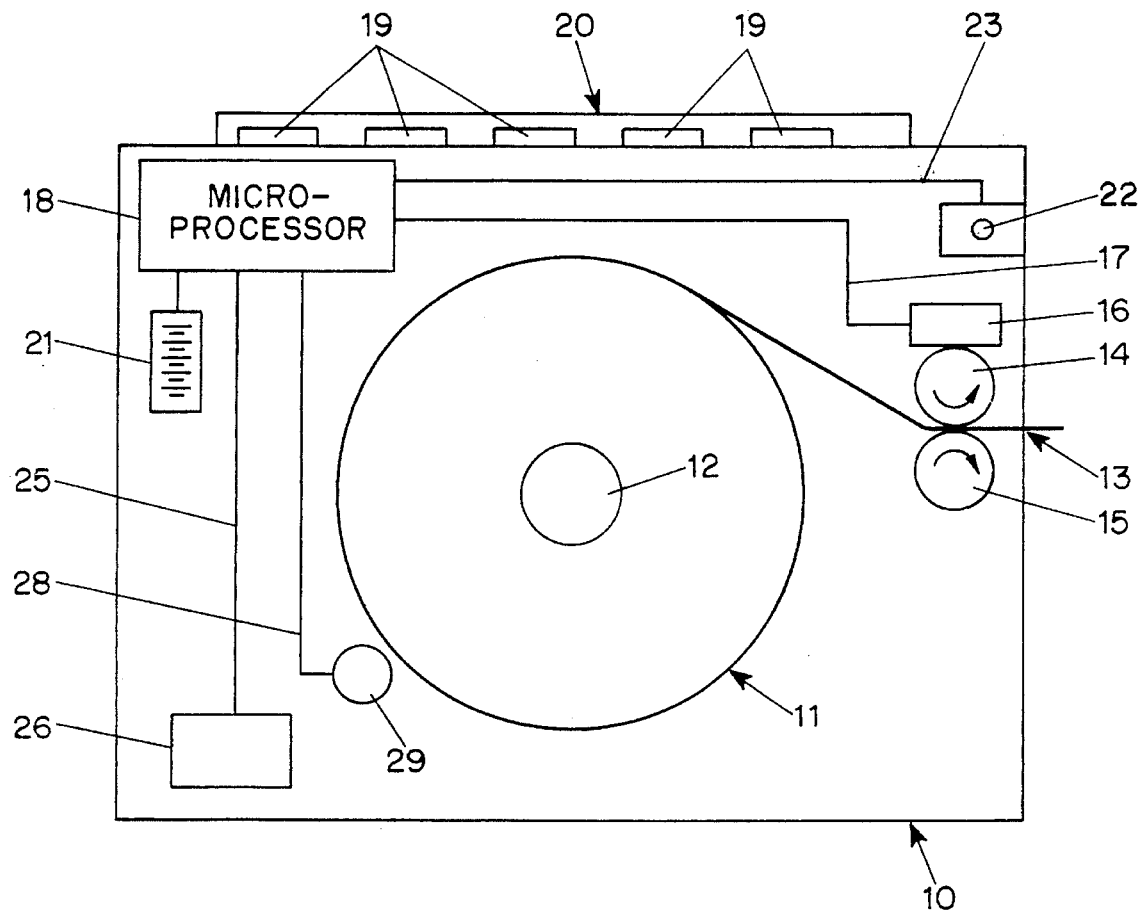
FIG. 1 is a schematic view in elevation illustrating the internal arrangement of a representative film canister arranged in accordance with the invention.
Figure 2:
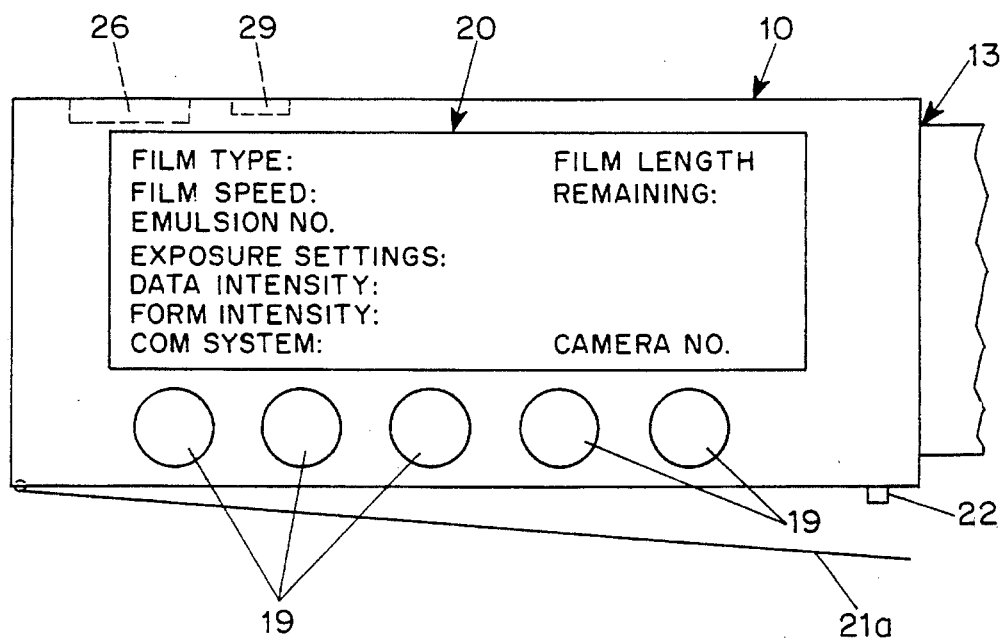
FIG. 2 is a schematic top view of the canister shown in FIG. 1 illustrating a representative data entry and display arrangement.

In the typical embodiment of the invention schematically shown in the drawings, a film canister 10 is arranged to hold a roll 11 of microfilm for use in a computer output microfilm (COM) system on a central core 12. Film from the roll 11 passes to a COM camera (not shown) through a light-tight opening 13 in one wall of the canister and, as the film is used by the COM system in which the canister 10 is mounted, it is drawn between a pair of rollers 14 and 15 which turn in the direction indicated by the arrows each time film is used.

Although either of the rollers 14 and 15 could be connected to a meter to measure the length of film passage between the rollers, such measurements have been found to be subject to significant inaccuracies for long film length, such as the 200 meter length of a COM roll.

Consequently, in order to assure an accurate indication of the length of film remaining in the roll 11, a motion detector 16 is mounted adjacent to the roller 14 to generate a signal on a line 17 connected to a microprocessor 18. The motion detector 16 may be of any conventional type, such as a mechanical gear or friction arrangement in which a switch within the detector 16 closes whenever the roller 14 starts turning and remains closed until the turning motion has stopped, or it may be an electrical detector responsive to electrical signals generated by motion of dielectric irregularities in the roller 14 when the roller is turning but not when the roll is stationary. Similarly, the detector 16 may be a magnetic detector for detecting variations in a magnetic field resulting from motion of the roller 14, or an optical detector, responsive to variations in reflectivity of the surface of the roller 14 to generate a signal when the reflectivity changes, but not when it is constant. Alternatively, a motion detector might be arranged to detect motion of the film itself rather than one of the rollers 14 and 15.

In conventional COM systems, a fixed standard length of film, such as 148 mm, is used by the system each time the camera withdraws film to record an image. Accordingly, the microprocessor 18 is programmed to deduct that length from the length of film previously remaining in the roll 11 each time it receives a signal on the line 17, thereby permitting a continuous and accurate determination of the amount of film remaining in the roll 11. Alternatively, if desired, the microprocessor may deduct the length of circumferential surface motion of the roller 14 each time it turns.

When a roll of film 11 is installed in the canister 10, the operator enters a number representing the total length of film in the roll into the microprocessor 18 using data entry keys 19 mounted at the top of the canister. Using the data entry keys, the operator also enters information about the film contained in the canister, such as film type, film speed, and emulsion number and data relating to the COM camera with which the film is to be used, including exposure settings such as data intensity and form intensity. These data are continuously displayed in an LCD display panel 20 at the top of the canister along with the length of film remaining in the roll 11 as determined by the micro-processor 18.

In order to maintain the information stored in the microprocessor memory and displayed in the display panel 20, a battery 21 is mounted within the canister to provide power for the microprocessor 18 and the display 20. When a new roll of film 11 is to be installed in the canister after a roll has been used, the canister is opened by unlocking a door 21a. This actuates a reset switch 22, sending a signal to the microprocessor 18 on a line 23 to erase the information regarding the film roll previously installed in the canister. This avoids any error resulting from a failure to enter appropriate information when a new roll of film is mounted in the canister.

If the canister 10 is to be used in a COM system of the type described, for example, in U.S. Pat. No. 4,987,300, in which the system determines the length of film remaining in the canister by detecting an optical signal generated by motion of a peripheral rim of a film reel flange, in which the rate of motion per unit length of film withdrawn increases as the diameter of the roll decreases, the microprocessor 18 is programmed by the keys 19 to determine from the length of film remaining in the roll 11 the rate at which signals should be provided to that COM system in order to permit the system to compute the amount of film remaining in the canister. As a result of the programming, the microprocessor supplies signals on a line 25 to an optical signal unit 26 which produces optical signals at the appropriate location on the outside wall of the canister in response to withdrawal of film from the canister at a rate depending on the diameter of the roll of film within the canister so as to provide the necessary information to that type of COM system.

If the canister 10 is to be used in a system of the type described, for example, in U.S. Pat. No. 5,153,625, the microprocessor 18 generates signals on a line 28 to activate a transmitter 29 which supplies electromagnetic signals through the wall of the canister at the appropriate location to actuate the signal detector used in that type of COM system. As in the case described above, the operator enters appropriate information through the keys 19 about the system in which the canister is being used to enable the microprocessor 18 to provide appropriate signals to the transmitter 29. If neither of the signals provided to the devices 26 and 29 would interfere with the operation of a COM system in which it is not used, the canister could be arranged to provide signals to both devices 26 and 29 at all times.

Alternatively, if the film canister is used in a COM system which can utilize signals corresponding to withdrawal of incremental film lengths used by the system, the device 26 or 29 may be arranged to transmit signals corresponding to incremental film length withdrawal rather than film roll rotation.

Although the invention has been described herein with respect to specific embodiments, many modifications and variations therein will readily occur to those skilled in the art. Accordingly, all such variations and modifications are included within the intended scope of the invention.

I claim:

1. A film canister for use with a computer output microfilm system comprising a container removably installable in a computer output microfilm system for holding a roll of film to be dispensed in incremental units to a computer output microfilm system, a motion detector in the container for detecting motion of film each time any film is withdrawn from the container, and a microprocessor in the container for computing the length of film remaining in the container based on the number of times the motion detector has been actuated and for retaining numerical information relating to the remaining length of film when the container is removed from a computer output microfilm system.

2. A film canister according to claim 1 wherein the microprocessor is arranged to compute the length of film remaining in the container based on the number of incremental units of film withdrawn from the container.

3. A film canister according to claim 1 including data entry means for entering into the microprocessor information relating to the length of film in a roll of film mounted in the container.

4. A film canister according to claim 1 including display means for displaying information relating to the length of film remaining in the container.

5. A film canister according to claim 4 wherein the display means is arranged to display information regarding characteristics of the film contained in the container and including data entry means enabling entry of information into the microprocessor regarding the film contained in the container.

6. A film canister according to claim 1 wherein the motion detector includes a film output roller and a detector for detecting motion of the output roller each time film is withdrawn from the container and supplying a corresponding signal to the microprocessor.

7. A film canister according to claim 1 including a battery mounted within the container for supplying power to the microprocessor.

8. A film canister according to claim 1 wherein the microprocessor is arranged to generate signals corresponding to film roll rotation as the diameter of a roll of film in the container decreases based on information relating to the length of film withdrawn from the container, and means for providing output signals corresponding to film roll rotation as film is withdrawn from the container.

9. A film canister according to claim 8 wherein the means for providing an output signals generates optical output signals.

10. A film canister according to claim 8 wherein the, means for providing output signals generates electromagnetic output signals.

11. A film canister according to claim 1 wherein the container includes a movable member arranged to permit access to the interior of the container for loading a roll of film and means for detecting motion of the movable member from a closed position and providing a corresponding signal to the microprocessor to erase information stored in the microprocessor.

12. A film canister for use with a computer output microfilm system comprising a container removably installable in a computer output microfilm system for holding a roll of film to be dispensed to a computer output microfilm system, a microprocessor in the container responsive to withdrawal of film from the container for computing the length of film remaining in the container based on the number of times any film has been withdrawn from the container and for retaining numerical information relating to the remaining length of film when the container is removed from a computer output microfilm system, and display means on the container responsive to the microprocessor for displaying numerical information relating to the length of film remaining in the container.

13. A film canister according to claim 12 wherein the display means is arranged to display information regarding characteristics of the film contained in the container and including data entry means enabling entry of information into the microprocessor regarding the film contained in the container.

14. A film canister according to claim 12 including a battery mounted within the container for supplying power to the microprocessor.

15. A film canister according to claim 12 wherein the microprocessor is arranged to generate signals corresponding to film roll rotation as the diameter of a roll of film in the container decreases based on information relating to the length of film withdrawn from the container, and means for providing output signals corresponding to film roll rotation as film is withdrawn from the container.

16. A film canister according to claim 12 wherein the means for providing an output signals generates optical output signals.

17. A film canister according to claim 12 wherein the means for providing output signals generates electromagnetic output signals.

18. A film canister according to claim 12 wherein the container includes a movable member arranged to permit access to the interior of the container for loading a roll of film and means for detecting motion of the movable member from a closed position and providing a corresponding signal to the microprocessor to erase information stored in the microprocessor.

* * * * *

UNITED STATES PATENT AND TRADEMARK OFFICE
CERTIFICATE OF CORRECTION

PATENT NO. : 5,572,271
DATED : November 5, 1996
INVENTOR(S) : Gregory F. Pelican It is certified that error appears in the above-indentified patent and that said Letters Patent is hereby corrected as shown below:

Column 1, line 26: "its" should read --it--.

Column 5, line 21: "an output" should read --output--.

Column 6, line 26: "an output" should read --output--.

Column 6, line 25: "claim 12" should read --claim 15--.

Column 6, line 28: "claim 12" should read --claim 15--.

Signed and Sealed this

First Day of April, 1997

BRUCE LEHMAN

Attest:

Attesting Officer

Commissioner of Patents and Trademarks